INVENTORS
CHESTER V. OUELLETTE
WILLIAM A. KNECHT

ATTORNEY

United States Patent Office 3,435,392
Patented Mar. 25, 1969

3,435,392
ALTERNATING CURRENT ROTARY SOLENOID HAVING A ROTOR WITH PERMANENT MAGNET POLES
Chester V. Ouellette, Manchester, and William A. Knecht, New Hartford, Conn., assignors to Consolidated Electronics Industries Corp., New York, N.Y., a corporation of Delaware
Filed Mar. 24, 1967, Ser. No. 625,796
Int. Cl. H01f 7/00, 7/08
U.S. Cl. 335—230     9 Claims

ABSTRACT OF THE DISCLOSURE

A rotary solenoid having a coil and a set of stator poles energized thereby and extending parallel to each other with a rotor having permanent magnetic poles pivotally mounted coaxially with respect to the stator poles. The rotor poles are close to the stator poles and in the absence of any magnetic field produced by the coil are attracted to one or the other of the sets of stator poles to pivot the rotor to one of two permissible positions. Indicia may be placed on the rotor to cooperate with fixed indicia to indicate the position of the rotor or the rotor may be connected by a ratchet to a gear mechanism to operate as a prime mover.

This invention relates to a rotary solenoid especially adapted to operate on alternating current of sinusoidal or complex waveform to produce rotary, stepwise motion or simple back-and-forth pivotal movement, such as may be required for an indicator.

It is one of the principal objects of the present invention to provide a solenoid suitable for construction in microminiature size and capable of operating either from an alternating current to operate some further mechanism, such as an elapsed time indicator, or from a special current such as one that indicates faulty operation of electrical equipment.

The solenoid of the present invention includes a coil wound upon a hollow core within which a shaft is pivotally supported. Two stator pole members are provided, one at each end of the core, magnetically connected to the core to be oppositely magnetically energized each time current flows in the coil, with specific magnetic polarity of the two pole members being dependent on the direction of current flow in the coil. Each of the pole members has a plurality of evenly spaced stator poles extending from it, preferably in a direction substantially parallel to the axis of the core and with poles of both members pointing in the same direction. The stator poles are arranged in pairs, comprising one pole from each of the two members, with the spacing between the two poles of each pair being substantially less than the spacing between the poles of adjacent pairs. The armature of the solenoid comprises a plurality of permanent magnetic poles corresponding in number to the number of pairs of poles. The magnetic poles may be on separate magnets attached to a non-magnetic support, and they are aligned so that their magnetic fields are substantially radial and so that one pole of each magnet is very close to the stator poles. In this way the energization of the coil produces a magnetic field which draws each of the permanent magnets to the poles of one of the pole members. Because of their permanent magnetic fields, the individual armature magnets produce a holding force to retain the armature in position when the current in the coil diminishes to zero, causing the armature to remain in whichever position it occupied before the current stopped. Only when the current in the coil is reversed will the permanent magnets of the armature be attracted to their alternate position by the resultant stator pole magnetic field. This reversal of current can be produced by an alternating current of sinusoidal waveform or it can be produced by a suitable pulse waveform provided there is the necessary reversal of current polarity.

The invention will be described in greater detail in the following specification together with the drawings in which.

Figure 1:
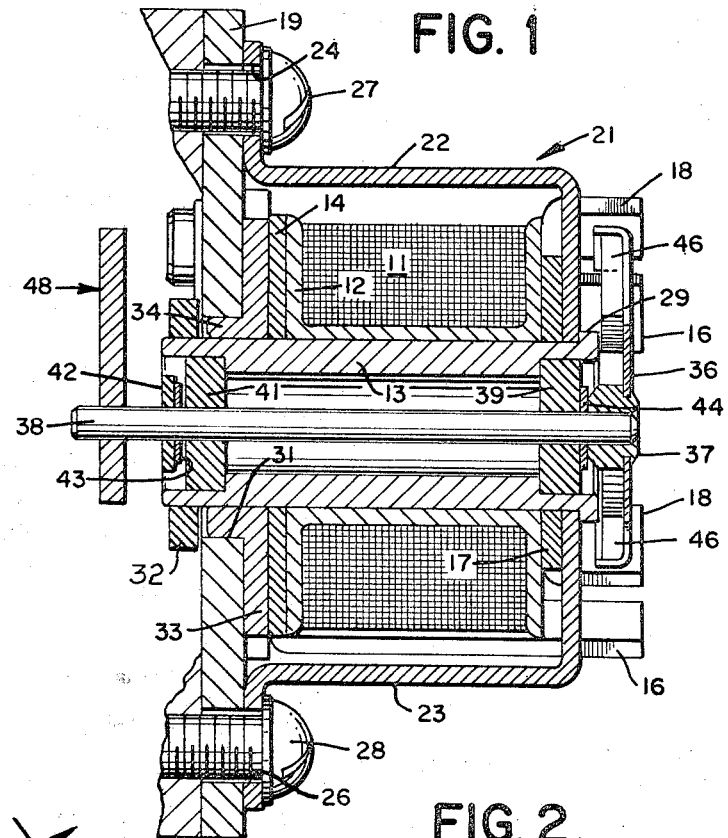
FIG. 1 is a cross-sectional view of a rotary solenoid constructed according to the invention.

The solenoid in FIG. 1 comprises a coil 11 wound on a bobbin 12 and having a hollow ferromagnetically soft core 13 of a suitable material such as steel. At one end of the bobbin 12 is a first stator member 14 also of ferromagnetically soft material and having a number of stator poles 16 formed or bent to extend from its perimeter in a direction substantially perpendicular to the plane of the member 14. At the other end of the coil 11 is a second disk-like ferromagnetically soft stator member 17 having a plurality of evenly spaced stator poles 18 extending from it in a direction subtantially parallel to the poles 16. The number of poles 18 is the same as the number of poles 16, and the disks 14 and 17 are angularly oriented so that their poles 16 and 18, respectively, are spaced in pairs, that is each of the poles 18 is much closer to the pole 16 on one side than to the pole 16 on the other side.

The coil 11 together with the rest of the stator structure is supported on a base plate 19 and is held in place by a clamp 21 that fits across the stator member 17 and has two legs 22 and 23 terminating in flanges 24 and 26, respectively, to be attached to the base plate 19 by machine screws 27 and 28.

A flange 29 on the same end of the core 13 as the stator member 17 holds the core with respect to the clamp 21. The other end of the core extends through an opening 31. The base plate 19 has a washer 32 attached to it to help keep it from pulling out. Between the base plate 19 and the stator member 14 is a positioning member, or plate, 33 having a short annular cylinder 34 extending from one side. The outer diameter of the cylinder 34 substantially matches the inner diameter of the circular opening 31 in the base plate 19 while the inner diameter of the cylinder 34 and plate 33 substantially matches the outer diameter of the core 29 but is eccentric with respect to the outer diameter of the cylinder 34. As a result, rotation of the positioning plate 33 shifts the axis of the core 13 laterally in a circle the radius of which depends on the aforementioned eccentricity.

The solenoid has an armature structure comprising a non-magnetic member 36 affixed to a hub 37 which in turn is non-rotatably mounted on a shaft 38 supported in two bearings 39 and 41 at opposite ends of the core 13. A washer 42 is pressed on to the shaft 38 to limit axial movement of the armature structure and two thrust washers 43 and 44 are located between the bearing 41 and the end-play washer 42 and between the other bearing 39 and the hub 37, respectively. The armature also includes permanent magnets 46 attached to the non-magnetic member 36 to be attracted to the stator poles 16 and 18.

Figure 2:
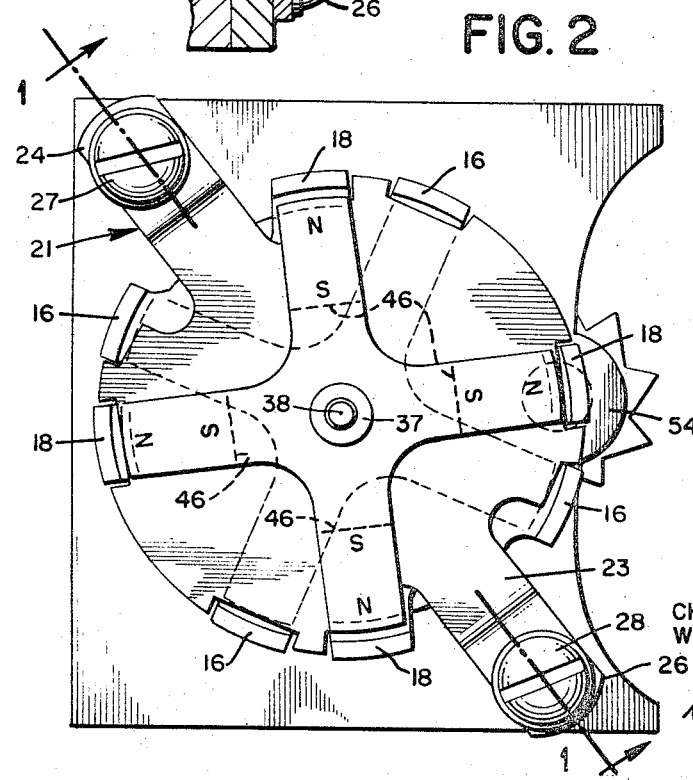
FIG. 2 is a view of one end of the solenoid of FIG. 1 showing the armature.

FIG. 2 shows an end view of the solenoid of FIG. 1 and illustraties the cruciform shape of the armature 36. The armature pivots between two end positions, one of which is shown in solid lines while the other is shown in broken lines. In each end position the arms of the armature 36 are aligned with one of the sets of stator poles, either the poles 18 or the poles 16. This alignment between the armature and the stator poles is caused by the magnetic fields of the individual magnets 46 which move the armature into position to achieve the lowest magnetic reluctance.

The angular width of each of the magnets 46 is preferably not substantially greater than, or it may perhaps be slightly smaller than, the angular width of each of the poles 16 and 18 so that there will be a definite alignment of the magnets 46 with one or the other of the sets of stator poles at all times. While the magnets 46 may be attached to the armature 36 in any convenient way, one of the most convenient, in view of the extremely small size of the components when the total diameter between diametrically opposite stator poles 16 is of the order of ⅜ of an inch, is simply to cement either individual magnets 46 in place under the arms of the armature. Instead of individual magnets, a single magnet properly magnetized and possibly of cruciform shape may be used. The single magnet could also replace the nonferrous armature 36.

Figure 3:
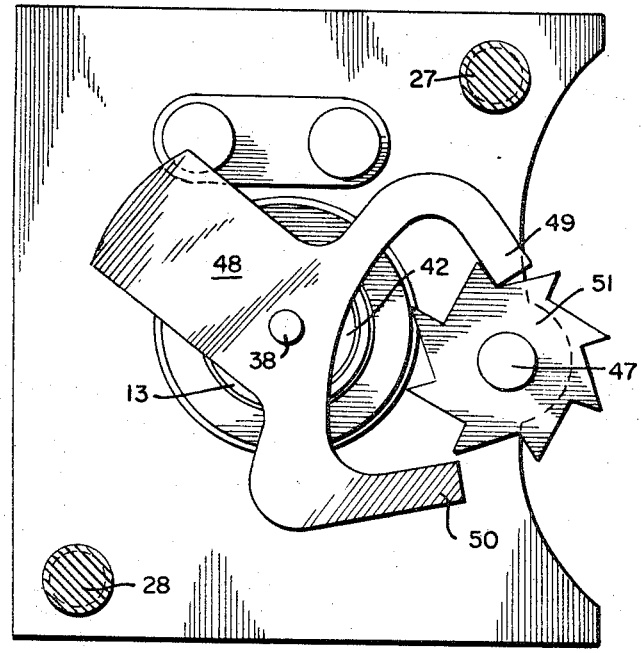
FIG. 3 is an end view of the opposite end of the solenoid of FIG. 1.

FIG. 3 shows a view of the other end of the solenoid including means to transmit the rotary back-and-forth motion of the shaft 38 into continuous motion of an adjacent shaft 47. The pivotal movement of the shaft 38 is transmitted to the shaft 47 by way of a pawl 48 rigidly attached to the shaft 38 and having two arms 49 and 50 that engage a ratchet wheel 51 on the shaft 47. Pivotal movement of the shaft 38 and pawl 48 in the embodiment shown produces clockwise rotation of the ratchet wheel 51 and its shaft 47. This movement is, of course, not continuous but occurs in a series of repeated steps. Because of the exceedingly small size of the components, it is necessary to insure that the rotation of the arms 49 and 50 of the pawl 48 is proper with respect to the ratchet wheel 51 and this is accomplished by rotation of the positioning plate 33 which, because of the eccentric relationship between the outer diameter and inner diameter of the cylindrical extension 34, changes the radial spacing between the shafts 38 and 47.

The solenoid may also be used simply as an indicator to indicate the nature of the current most recently applied to it. Because of the ability of the permanent magnets 46 attached to the armature 36 to hold the armature in whichever of its two end positons it occupied as a result of the most recently applied current, the solenoid can indicate whether current of one polarity or the other polarity was last applied to the coil 11. For this purpose a disk 53 may be attached to the same end of the shaft 38 as the armature 36. The disk is viewed through transparent windows or openings 54 in a cover plate 56 inserted into the end of the cylindrical container 57 in which the body of the solenoid is located. The cover 56 has a cylindrical rim 58 which fits against the ends of the stator poles 16 and 18 and has notches cut out to receive the ends of the stator poles and thus to provide angular alignment of the cover plate 56 with respect to the stator poles 16 and 18 and with respect to the disk 53.

Figure 4:
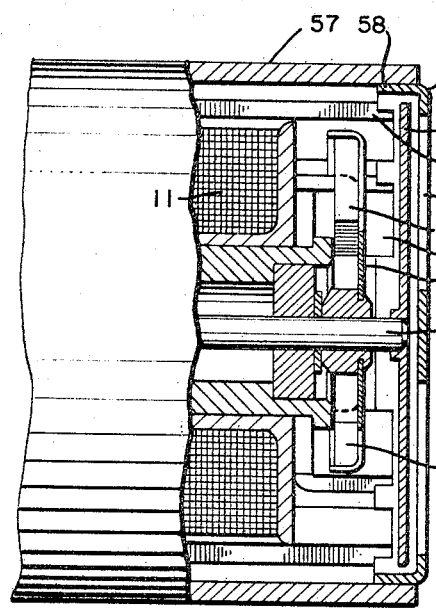
FIG. 4 shows an indicator arrangement for use with the solenoid of FIG. 1.
Figure 5:
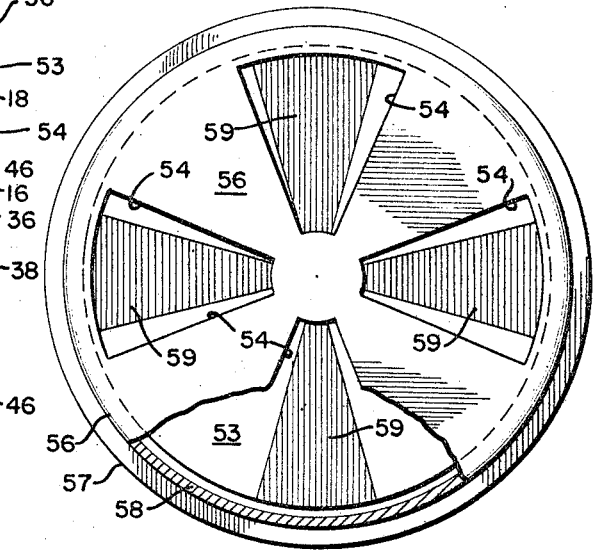
FIG. 5 is an end view of the indicator of FIG. 4.

The reason for the alignment is more apparent in FIG. 5 which is an end view of the structure of FIG. 4 with a portion of the cover plate 56 broken away to show more of the disk 53. As may be seen the cover plate 56 has several wedge-shaped transparent windows or openings 54. The disk 53 has wedge-shaped colored segments 59 aligned with the wedge-shaped openings 54. Preferably the outer surface of the cover plate 56 is colored the same as the entire front surface of the disk 53 except for the segments 59. These are colored differently; for example they may be colored red whereas the remainder of the disk 53 and the entire surface of the plate 56 may be colored black. Other color combinations of course may be used instead. In any case the preferred arrangement is that, with the disk 53 in the position shown in FIG. 5 the segments 59 should be clearly visible through the openings 54 and the remainder of the entire face should be a different color. On the other hand, when the coil 11 is properly energized to move the rotor 36 to its alternate position as shown in FIG. 2, the disk 53 is rotated about 30° because the angular separation of each stator pole 16 from the pole 18 in the same pair is about 30° in this embodiment. When the disk 53 rotates through this 30° angle, the segments 59 entirely disappear behind the solid portions of the disk 56, leaving only a single color visible from outside, that being the color of the cover plate 56 and the major part of the disk 53. This requires that the included angle of each colored segment be less than the angle through which the disk is rotated and that the included angle of each window 54 be not greater than the angle through which the disk 53 is rotated. Thus this solenoid arrangement could be used to provide a clear indication of which of the two end positions the armature 36 was in. An indicator of this type is extremely useful in conjunction with electronic equipment which puts out a signal of one polarity when it is operating properly and a signal of the opposite polarity when it is not operating properly.

The arrangement of the magnets 46 quite close to and substantially concentric with the adjacent parts of the stator poles 16 and 18 results in an efficient magnetic structure capable of operating at relatively high speeds. For example with the solenoid having an outer diameter of approximately ⅜ of an inch, the armature 36 may be pivoted back and forth quite reliably and satisfactorily with an energizing alternating current of up to 140 cycles or more applied to the coil 11.

While this invention has been described in terms of a specific embodiment modifications may be made therein within the scope of the following claims, as will be apparent to those skilled in the art.

What is claimed is:

1. Electro-mechanical actuating apparatus comprising a coil; a hollow, ferromagnetically soft core extending through said coil; bearing means supported by said core; a shaft supported in said bearing means; a first set of ferromagnetically soft stator poles magnetically coupled to one end of said coil to induce in said poles a predetermined magnetic polarity when electrical current flows through said coil in one direction, said poles extending along the outside of said coil substantially parallel to said shaft and beyond the other end of said coil and being equally angularly spaced around said coil, the angular width of each of said stator poles being substantially less than the angular spacing between adjacent ones of said poles; a second set of ferromagnetically soft stator poles magnetically coupled to said other end of said coil to induce in said second set of poles the opposite magnetic polarity from said first set of poles when current flows in said one direction in said coil, the number of poles of said second set being equal to the number of poles of said first set and equally spaced apart angularly, said second set of poles extending substantially parallel to said first set and beyond said other end of said coil, each of said poles of said second set being paired with one of said poles of said first set whereby the spacing between the poles of a pair is substantially less than the spacing between a pole of one pair and the closest pole of the next adjacent pair; and a permanently magnetized armature, attached to said shaft to rotate therewith and having a plurality of permanent magnetic poles of like polarity, each of said armature poles being adjacent to said sets of stator poles to interact with any magnetic field induced in said stator poles and to align said armature so that said permanent magnetic poles are substantially aligned with the stator poles of one of said sets when said coil is de-energized.

2. The device of claim 1 in which the angular width of each of said poles of said second set is substantially equal to the angular width of each of said poles of said first set.

3. The device of claim 1 in which said armature comprises a plurality of permanent magnets each having a north pole and a south pole aligned substantially radially with respect to said shaft and with the outermost pole of each of said magnets having the same magnetic polarity.

4. The device of claim 3 in which the angular width of the ends of each of said magnets adjacent to said stator poles is not substantially greater than the angular width of said stator poles of said first set.

5. The device of claim 4 in which the angular width of the poles of said second set of stator poles is substantially equal to the angular width of the poles of said first set of stator poles, and said rotor comprises a non-ferromagnetic member having a plurality of arms, the number of said arms being equal to the number of pairs of stator poles, each of said magnets being adhesively attached to a respective one of said arms.

6. The device of claim 1 comprising, in addition; a disk attached to the end of said shaft adjacent to said armature with said armature between said disk and said coil; an end plate rigidly positioned with respect to said stator poles and comprising an opaque portion and a window through which portions of said disk may be viewed, said end plate being substantially parallel to said disk with disk between said end plate and said rotor; and indicia on selected portions of the surface of said disk facing said end plate to be viewed through said window according to the relative angular orientation of said disk and said end plate.

7. The device of claim 6 comprising, in addition: a cylindrical shell closely surrounding said stator poles, said end plate comprising a cylindrical rim extending into one end of said shell and bearing against the ends of said stator poles.

8. The device of claim 7 in which said rim of said end plate comprises notches interfitting with said stator poles to determine the relative angular orientation of said end plate with respect to said stator poles.

9. The device of claim 6 in which said indicia on said disk comprise a plurality of wedge-shaped segments colored differently from the remainder of the surface of said disk, and said windowed end plate comprises a plurality of wedge-shaped windows equal in number to the number of said segments on said disk and equal in number to the number of said pairs of poles and wedge-shaped opaque portions between said windows, said wedge-shaped segments on said disk being aligned with said windows when said magnets of said armature are aligned with the stator poles of one set of said stator poles and being hidden behind said opaque portions when said magnets of said armature are aligned with the other set of stator poles.

References Cited
UNITED STATES PATENTS

| | | | |
|---|---|---|---|
| 3,001,107 | 9/1961 | Rhodes | 335—272 |
| 3,030,469 | 4/1962 | Lazich | 335—125 XR |
| 3,234,436 | 2/1966 | Bieger | 335—272 XR |

GEORGE HARRIS, *Primary Examiner.*

U.S. Cl. X.R.

335—272; 340—373